US012624219B2

(12) United States Patent
Kim et al.

(10) Patent No.: US 12,624,219 B2
(45) Date of Patent: May 12, 2026

(54) PHOTOCURABLE RESIN COMPOSITION FOR SURGICAL GUIDE AND SURGICAL GUIDE MADE THEREFROM AND METHOD FOR MANUFACTURING SAME

(71) Applicant: OSSTEMIMPLANT CO., LTD., Seoul (KR)

(72) Inventors: Kyoung-Rok Kim, Busan (KR); Bo Mi Yang, Busan (KR); Giho Choi, Busan (KR)

(73) Assignee: OSSTEMIMPLANT CO., LTD., Seoul (KR)

( * ) Notice: Subject to any disclaimer, the term of this patent is extended or adjusted under 35 U.S.C. 154(b) by 744 days.

(21) Appl. No.: 18/007,581

(22) PCT Filed: May 13, 2021

(86) PCT No.: PCT/KR2021/006028
§ 371 (c)(1),
(2) Date: Dec. 1, 2022

(87) PCT Pub. No.: WO2021/246677
PCT Pub. Date: Dec. 9, 2021

(65) Prior Publication Data
US 2023/0235180 A1 Jul. 27, 2023

(30) Foreign Application Priority Data
Jun. 2, 2020 (KR) ........................ 10-2020-0066268

(51) Int. Cl.
| | |
|---|---|
| C09D 4/06 | (2006.01) |
| A61C 1/08 | (2006.01) |
| B29C 64/129 | (2017.01) |
| B29C 64/35 | (2017.01) |
| B33Y 10/00 | (2015.01) |
| B33Y 40/20 | (2020.01) |
| B33Y 70/00 | (2020.01) |
| B33Y 80/00 | (2015.01) |
| C09D 7/48 | (2018.01) |
| C09D 7/63 | (2018.01) |
| C09D 135/02 | (2006.01) |
| B29K 33/00 | (2006.01) |
| B29L 31/00 | (2006.01) |

(52) U.S. Cl.
CPC ............... *C09D 4/06* (2013.01); *A61C 1/084* (2013.01); *B29C 64/129* (2017.08); *B29C 64/35* (2017.08); *B33Y 10/00* (2014.12); *B33Y 40/20* (2020.01); *B33Y 70/00* (2014.12); *B33Y 80/00* (2014.12); *C09D 7/48* (2018.01); *C09D 7/63* (2018.01); *C09D 135/02* (2013.01); *B29K 2033/08* (2013.01); *B29L 2031/7546* (2013.01)

(58) Field of Classification Search
None
See application file for complete search history.

(56) References Cited

U.S. PATENT DOCUMENTS

| | | | | |
|---|---|---|---|---|
| 4,327,014 A * | 4/1982 | Kawahara | ................ | A61K 6/77 |
| | | | | 524/789 |
| 7,081,485 B2 * | 7/2006 | Suh | ........................ | A61K 6/887 |
| | | | | 522/186 |
| 7,927,538 B2 * | 4/2011 | Moszner | ................ | A61L 27/46 |
| | | | | 430/269 |
| 8,906,981 B2 * | 12/2014 | Yang | ........................ | A61C 5/70 |
| | | | | 523/115 |
| 10,299,896 B2 * | 5/2019 | Sun | ........................ | A61K 6/884 |
| 10,471,655 B2 * | 11/2019 | Menyo | ................ | C08G 73/065 |
| 11,040,483 B2 * | 6/2021 | Menyo | ............. | C08G 73/0661 |
| 11,090,859 B2 * | 8/2021 | Menyo | .................. | B29C 64/124 |
| 11,135,137 B2 | 10/2021 | Takada et al. | | |
| 12,286,512 B2 * | 4/2025 | Potkay | .................. | C12M 23/24 |
| 2005/0154081 A1 * | 7/2005 | Yin | ........................ | A61K 6/887 |
| | | | | 523/115 |
| 2005/0288387 A1 * | 12/2005 | Feng | ........................ | A61K 6/62 |
| | | | | 523/113 |
| 2015/0257985 A1 * | 9/2015 | Sadowsky | .............. | A61K 6/887 |
| | | | | 264/16 |
| 2016/0081887 A1 * | 3/2016 | Abuelyaman | ........ | A61C 19/003 |
| | | | | 523/115 |
| 2017/0173866 A1 * | 6/2017 | Schonenberg | ......... | B33Y 10/00 |
| 2018/0078348 A1 * | 3/2018 | Ruppert | ............. | A61C 13/0004 |

(Continued)

FOREIGN PATENT DOCUMENTS

| | | | | | |
|---|---|---|---|---|---|
| CN | 105491976 A | * | 4/2016 | .......... | B29C 64/135 |
| CN | 108047386 A | | 5/2018 | | |
| ES | 2792224 T3 | * | 11/2020 | ............. | C08L 33/12 |

(Continued)

OTHER PUBLICATIONS

Jain et al. (2016). Recent trends of 3-D printing in dentistry-a review. Ann Prosthodont Rest Dent, 2(1), 101-104. (Year: 2016).*

(Continued)

*Primary Examiner* — Sanza L. McClendon
(74) *Attorney, Agent, or Firm* — Sughrue Mion, PLLC

(57) ABSTRACT

One aspect of the present invention provides a photocurable resin composition for a surgical guide, which comprises 20 to 50 parts by weight of (meth)acrylate-based urethane copolymer; 40 to 70 parts by weight of a first (meth)acrylate-based monomer; 4 to 9 parts by weight of a second (meth) acrylate-based monomer; 1 to 4 parts by weight of a photoinitiator; and 0.005 to 1 parts by weight of a UV absorber, a surgical guide manufactured therefrom, and a method for manufacturing the same.

10 Claims, 1 Drawing Sheet

(56) References Cited

U.S. PATENT DOCUMENTS

| | | | | |
|---|---|---|---|---|
| 2021/0276243 A1* | 9/2021 | Takada | .................... | C08L 51/08 |
| 2021/0317297 A1* | 10/2021 | Jena | ....................... | A61C 13/34 |

FOREIGN PATENT DOCUMENTS

| | | | | | | |
|---|---|---|---|---|---|---|
| JP | 2002255722 | A | * | 9/2002 | | |
| JP | 2010-037254 | A | | 2/2010 | | |
| JP | 2015038166 | A | * | 2/2015 | | |
| JP | 2016-71784 | A | | 5/2016 | | |
| JP | 2020-075941 | A | | 5/2020 | | |
| KR | 10-2016-0021741 | A | | 2/2016 | | |
| KR | 10-2016-0087151 | A | | 7/2016 | | |
| KR | 102080721 | B1 | * | 4/2020 | ............. | A61K 6/887 |
| KR | 10-2020-0051623 | A | | 5/2020 | | |
| WO | WO-2005087179 | A1 | * | 9/2005 | ............. | A61K 6/887 |
| WO | WO-2016142323 | A1 | * | 9/2016 | ........... | B29C 64/259 |
| WO | WO-2018105463 | A1 | * | 6/2018 | ........... | C08F 290/06 |
| WO | 2019/049426 | A1 | | 3/2019 | | |
| WO | WO-2019048963 | A1 | * | 3/2019 | .............. | A61K 6/17 |
| WO | WO-2019211420 | A1 | * | 11/2019 | .............. | A61C 5/50 |
| WO | 2020/003169 | A1 | | 1/2020 | | |
| WO | 2020/005413 | A1 | | 1/2020 | | |

OTHER PUBLICATIONS

Office Action of KR10-2020-0066268 dated Jun. 14, 2021.
International Search Report of PCT/KR2021/006028 dated Aug. 26, 2021 [PCT/ISA/210].

* cited by examiner

[Fig. 1]
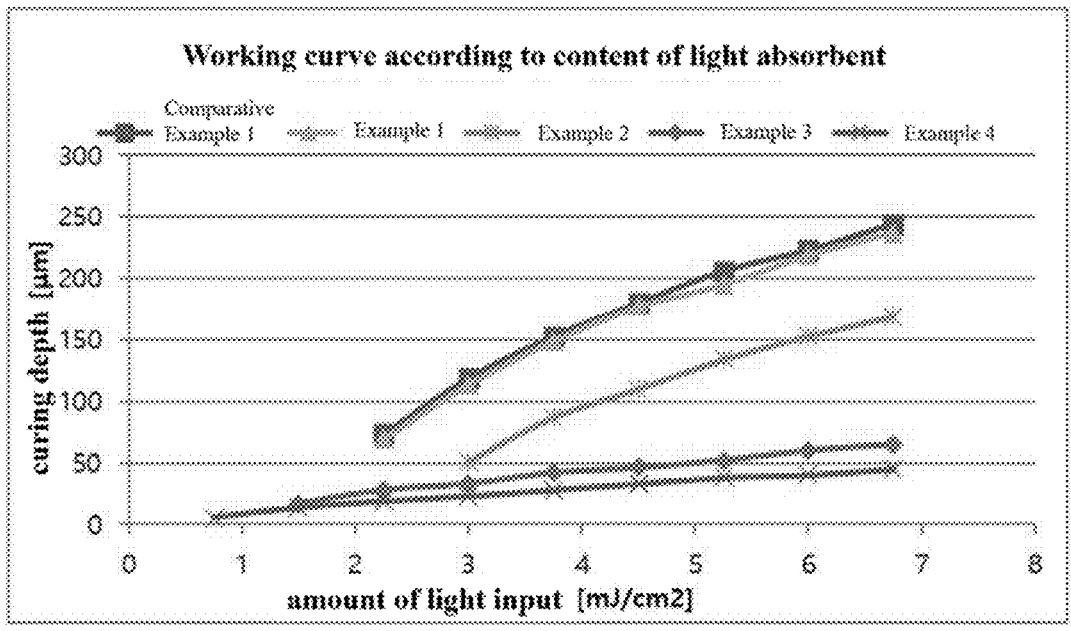
[Fig. 2]
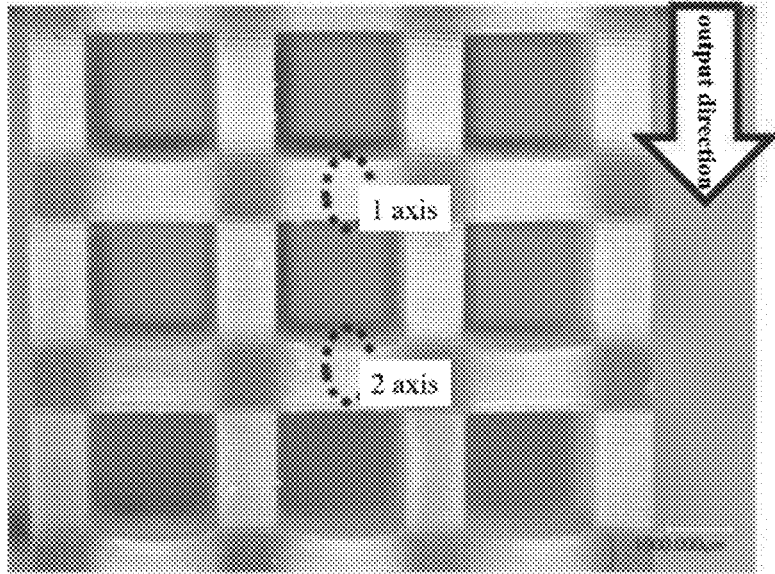

PHOTOCURABLE RESIN COMPOSITION FOR SURGICAL GUIDE AND SURGICAL GUIDE MADE THEREFROM AND METHOD FOR MANUFACTURING SAME

CROSS REFERENCE TO RELATED APPLICATIONS

This application is a National Stage of International Application No. PCT/KR2021/006028, filed May 13, 2021, claiming priority to Korean Patent Application No. 10-2020-0066268, filed Jun. 2, 2020, the entire disclosures of which are incorporated herein by reference.

TECHNICAL FIELD

The present invention relates to a photocurable resin composition for a surgical guide, a surgical guide made therefrom, and a method for manufacturing the same.

BACKGROUND ART

Dental implant surgery is a medical practice that restores lost dental function by implanting an artificial tooth in a missing tooth. A medical device that fixes artificial teeth to the jawbone is called a fixture, and the operator inserts the fixture through drilling and fixes it to the patient's jawbone. At this time, the planned insertion position and angle of the fixture are changed according to the skill level of the operator, and these errors adversely affect the durability of the implanted fixture and artificial teeth.

In order to improve this problem, it was attempted to introduce a surgical guide, a device for guiding the operator to the insertion position and angle of the fixture according to the procedure plan.

The surgical guide has a drill hole through which the fixture and drill can pass, and is a device that guides implantation surgery using the position and angle of the drill hole. The operator can increase the success rate by managing implantation errors to a minimum through this surgical guide.

However, the existing surgical guide was manufactured through milling, and the milling takes a long time to manufacture and it was difficult to implement a complex shape.

Accordingly, it was attempted to prepare a resin composition for a surgical guide that can be applied to a 3D printing, but in the case of a surgical guide for the 3D printing manufactured by light irradiation, there may be a problem in safety.

In order to solve the above problems, there is a demand for the development of a resin composition for a surgical guide or a surgical guide that can shorten the manufacturing time of the surgical guide and implement safety and complex shape through the additive manufacturing.

DETAILED DESCRIPTION OF INVENTION

Technical Task

The present invention aims at solving the problems of prior art as described above, and it is an object of the present invention to provide a photocurable resin composition for a surgical guide excellent in precision and photostability.

Means for Solving Technical Task

One aspect of the present invention provides a photocurable resin composition for a surgical guide, which comprises 20 to 50 parts by weight of (meth)acrylate-based urethane copolymer; 40 to 70 parts by weight of a first (meth)acrylate-based monomer; 4 to 9 parts by weight of a second (meth) acrylate-based monomer; 1 to 4 parts by weight of a photoinitiator; and 0.005 to 1 parts by weight of a UV absorber.

According to an embodiment, the first and second (meth) acrylate-based monomers may be polyfunctional and mono-functional (meth)acrylate-based monomers, respectively.

According to an embodiment, the photoinitiator may be one selected from a group consisting of acetophenone-based compound, a benzophenone-based compound, a triazine-based compound, a biimidazole-based compound, a thioxanthone-based compound, an oxime ester-based compound, an acylphosphine oxide-based compound, and a mixture of at least two of the above compounds.

According to an embodiment, the UV absorber may be one selected from a group consisting of a phenyl salicylate-based absorber, a benzophenone-based absorber, and a benzotriazole-based absorber.

According to an embodiment, the composition may be a liquid composition used for one 3D printing selected from a group consisting of a stereolithography apparatus, a digital light source processing, and a stereolithography surface curing method.

Another aspect of the present invention provides a surgical guide manufactured by irradiating the above-mentioned photocurable resin composition for a surgical guide by 3D printing.

According to an embodiment, the surgical guide may be manufactured by irradiating light from a light source of 360 to 405 nm.

Another aspect of the present invention provides a method for manufacturing a surgical guide, which comprises the steps of: (a) preparing the above-mentioned photocurable resin composition for a surgical guide; (b) laminating the photocurable resin composition by 3D printing; (c) washing a product of the step (b) with a washing solution; and (d) curing a product of the step (c) with a light source of 360 to 405 nm for 10 to 30 minutes.

According to an embodiment, the 3D printing in the step (b) may be performed in the light source of 360 to 405 nm.

According to an embodiment, the 3D printing may be performed by one selected from a group consisting of a stereolithography apparatus, a digital light source processing, and a stereolithography surface curing method.

According to an embodiment, a z-axis precision of the 3D printing may be 50 to 100 μm.

Effect of Invention

The photocurable resin composition for a surgical guide according to one aspect of the present invention may be excellent in precision and photostability by adjusting the contents of the UV absorber and the photoinitiator.

The effects of the present invention are not limited to the above-mentioned effects, and it should be understood that the effects of the present invention include all effects that could be inferred from the configuration of the invention described in the detailed description of the invention or the appended claims.

BRIEF DESCRIPTION OF DRAWINGS

FIG. 1 is a working curve graph according to the content of a light absorbent of a composition in an example and a comparative example of the present invention; and FIG. 2 is an image of a scaffold cube manufactured by using a 3D printer for a composition in an example and a comparative example of the present invention.

DETAILED MEANS FOR CARRYING OUT THE INVENTION

Hereinafter, the present invention will be explained with reference to the accompanying drawings. The present invention, however, may be modified in various different ways, and should not be construed as limited to the embodiments set forth herein. Also, in order to clearly explain the present invention in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

When a range of numerical values is described herein, the value has the precision of the significant figures provided according to the standard rules in chemistry for significant figures, unless a specific range thereof is stated otherwise. For example, 10 includes a range of 5.0 to 14.9 and the number 10.0 includes a range of 9.50 to 10.49.

Herein, "(meth)acryl-" means "methacryl-," "acryl-," or both.

Hereinafter, the embodiments of the present invention will be explained in detail with reference to the accompanying drawings.

A Photocurable Resin Composition for a Surgical Guide

One aspect of the present invention provides a photocurable resin composition for a surgical guide, which comprises 20 to 50 parts by weight of (meth)acrylate-based urethane copolymer; 40 to 70 parts by weight of a first (meth)acrylate-based monomer; 4 to 9 parts by weight of a second (meth)acrylate-based monomer; 1 to 4 parts by weight of a photoinitiator; and 0.005 to 1 parts by weight of a UV absorber.

If a composition ratio of the composition is out of the above range, a curing rate may be too slow, or defects may occur in physical properties of the manufactured surgical guide.

Additionally, when the contents of the photoinitiator and the UV absorber satisfy the above range, in case of applying the photocurable resin composition to the 3D printer, the z-axis precision would be excellent, and deterioration of photostability due to the continuous light source processing may be prevented. For example, if the content ratio of the (meth)acrylate-based urethane copolymer to the photoinitiator and the UV absorber is out of the above range, the photocuring does not occur sufficiently, resulting in the deterioration of the physical properties. Additionally, the precision of the surgical guide may be reduced, and thereby surgical precision through the surgical guide may be reduced as well.

The first and second (meth)acrylate-based monomers may be polyfunctional and monofunctional (meth)acrylate-based monomers, respectively.

The monofunctional (meth)acrylate-based monomer may be a (meth)acrylic acid ester-based, (meth)acrylate silane-based, and nitrogen-containing compound-based monomer. As a specific example, the monofunctional (meth)acrylate-based monomer may be one selected from a group consisting of methyl(meth)acrylate, ethyl(meth)acrylate, butyl (meth)acrylate, hexyl(meth)acrylate, glycidyl(meth) acrylate, lauryl(meth)acrylate, cyclohexyl(meth)acrylate, benzyl(meth)acrylate, allyl(meth)acrylate, 2-ethoxyethyl (meth)acrylate, glycerol(meth)acrylate, isobornyl(meth) acrylate, γ-(meth)acryloyloxypropyltrimethoxysilane, γ-(meth)acryloyloxypropyltriethoxysilane, tetrahydrofurfuryl(meth)acrylate, 2-(N,N-dimethylamino)ethyl(meth)acrylate and N-methylol(meth)acrylamide, but is not limited thereto.

The polyfunctional (meth)acrylate-based monomer may be one selected from a group consisting of 2 to 6-functional (meth)acrylate-based monomers.

As a specific example, the bifunctional (meth)acrylate-based monomer is 1,2-ethylene glycol diacrylate, 1,12-dodetandiol acrylate, 1,4-butanediol di(meth)acrylate, 1,6-hexanediol di(meth)acrylate, neopentylglycol di(meth) acrylate, polyethylene glycol di(meth)acrylate, neopentylglycol adipate di(meth)acrylate, hydroxyl puivalic acid neopentyl glycol di(meth)acrylate, dicyclopentanyl di(meth)acrylate, caprolactone-modified dicyclopentenyl di(meth)acrylate, ethylene oxide-modified di(meth)acrylate, allylated cyclohexyl di(meth)acrylate, tricyclodecanedimethanol(meth)acrylate, dimethylol dicyclopentane di(meth) acrylate, ethylene oxide-modified hexahydrophthalic acid di(meth)acrylate, tricyclodecane dimethanol(meth)acrylate, neopentyl glycol modified trimethyl propane di(meth)acrylate, adamantane di(meth)acrylate, 9,9-bis[4-(2-acryloyloxyethoxy)phenyl]fluorine or bisphenol A ethoxylate di(meth)acrylate.

The trifunctional (meth)acrylate-based monomer is trimethylolpropane tri(meth)acrylate, dipentaerythritol tri(meth) acrylate, propionic acid-modified dipentaerythritol tri(meth) acrylate, pentaerythritol tri(meth)acrylate or propylene oxide-modified trimethylolpropane tri(meth)acrylate.

The tetrafunctional (meth)acrylate-based monomer may be diglycerin tetra(meth)acrylate or pentaerythritol tetra (meth)acrylate, the pentafunctional (meth)acrylate-based monomer is propionic acid-modified dipentaerythritol penta (meth)acrylate, and the hexafunctional (meth)acrylate-based monomer is dipentaerythritol hexa(meth)acrylate or caprolactone-modified dipentaerythritol hexa(meth)acrylate, but are not limited thereto.

The (meth)acrylate-based urethane copolymer may be a copolymer in which at least one selected from a group consisting of monofunctional (meth)acrylate-based or polyfunctional (meth)acrylate-based monomers and a urethane-based monomer are copolymerized, and for example, may be a urethane-di(meth)acrylate copolymer, but is not limited thereto.

The photoinitiator may be one selected from a group consisting of an acetophenone-based compound, a benzophenone-based compound, a triazine-based compound, a biimidazole-based compound, a thioxanthone-based compound, an oxime ester-based compound, an acylphosphine oxide-based compound, and a mixture of at least two of the above compounds, and for example, may be phenylbis(2,4,6-trimethylbenzoyl)-phosphine oxide, but is not limited thereto.

The UV absorber may be one selected from a group consisting of a phenyl salicylate-based absorber, benzophenone-based absorber, and benzotriazole-based absorber, and for example, may be a benzophenone-based absorber or benzotriazole-based absorber. As a specific example, the UV absorber may be 2,5-bis(5-quaternary-butylbenzoxazol-2-yl)thiophene, 2-hydroxy-4-methoxybenzophenone, 2-hydroxy-4-octoxybenzophenone, 2,2'-di-hydroxy-4-methoxy-benzophenone, 2-(2'-hydroxy-5'-methylphenyl)benzotriazole, 2-(2'-hydroxy-3',5'-t-butylphenyl)benzotriazole, 2-(2'-hydroxy-5'-t-octylphenyl)benzotriazole or 2,4-di-t-butylphenyl-3',5'-di-t-butyl-4'-hydroxybenzotriazole.

The content of the UV absorber may be 0.005 to 1 parts by weight, for example, 0.005 part by weight, 0.05 part by weight, 0.5 part by weight, 1.0 part by weight, or a value between two of them.

When the UV absorber is a benzophenone-based absorber, it may be well combined with a photoinitiator to improve photostability of the manufactured surgical guide. Specifically, the photostability can be improved by including the UV absorber, but if the content of the UV absorber exceeds 1 part by weight, it is precipitated without dissolving in the composition exceeding the solubility of the UV absorber, and the thickness of the layer to be laminated, that is, the z-axis precision, may be excessively out of the range of 50 to 100 μm. Additionally, when the UV absorber is less than 0.005 part by weight, the thickness of the layer to be laminated, that is, the z-axis precision, is out of 100 μm, and the effect of improving the photostability may be insufficient.

The term "photostability" used herein refers to a property indicating how constant the degree of lamination curing is according to the amount of light applied.

The composition may be a liquid composition used for one 3D printing selected from a group consisting of a stereolithography apparatus, a digital light source processing, and a stereolithography surface curing method. Accordingly, the 3D printing may be performed using a printer using a liquid resin. A photocurable 3D printer is a type of printer that hardens a material by irradiating light to a desired area for output. Compared to other printing methods, the photocurable 3D printer has superior surface roughness and is advantageous for manufacturing complex structures.

In the stereolithography apparatus method, a molded article may be manufactured by projecting an ultraviolet laser to a water tank containing a photocurable resin composition, curing the photocurable resin composition, and laminating the same. In the case of SLA 3D printing, the wavelength of the irradiated laser may be changed depending on the type of composition, and the curing speed, strength, surface roughness, etc. of the cured molded article may vary.

The digital light source processing is a mask projection image curing method, and by selectively projecting and curing light on the photocurable resin, it is possible to manufacture a molded article having a desired shape. Unlike the general method of producing the product as a mold plate moves down, the mold plate moves up to create the product in the down direction. In this case, the light provided from a beam projector may be projected onto the curing resin composition for 3D printing to manufacture the molded article. In other words, the mold plate is cured sequentially in units of slice cross-sectional layers, and a 3D molded article can be manufactured.

The stereolithography surface curing method is a method of using an LCD, which is a liquid crystal display device developed with a high resolution, as an imaging source, and is a method that is inexpensive and enables a large-area high-resolution output. Compared to laser or projection type printers, the stereolithography surface curing method has the advantage that a large-area output is possible, and it can produce a large amount at a time, resulting in the excellence in productivity. Additionally, when dividing printing time by the number of unit printouts, the printing time per printout can be shortened.

Surgical Guide

Another aspect of the present invention provides a surgical guide manufactured by irradiating the above-mentioned photocurable resin composition for a surgical guide by 3D printing.

The surgical guide may be manufactured by irradiating light from a light source of 360 to 405 nm, and may be, for example, 380 to 400 nm. When the light source irradiated with light is out of the above range, the proper curing may not occur during the additive manufacturing, and it may be difficult to maintain an appropriate shape in the entire process of the subsequent additive manufacturing, washing, and post-curing.

In addition, the surgical guide may have a form of a complete surgical guide through the process of washing and post-curing after the additive manufacturing, and during the post-curing, the light source may also be in the same range as the light source used for the additive manufacturing.

A Method for Manufacturing a Surgical Guide

Another aspect of the present invention provides a method for manufacturing a surgical guide comprising the steps of: (a) preparing the above-mentioned photocurable resin composition for a surgical guide; (b) laminating the photocurable resin composition by 3D printing; (c) washing a product of the step (b) with a washing solution; and (d) curing the product of the step (c) with a light source of 360 to 405 nm for 10 to 30 minutes.

In the step (a), the above-mentioned photocurable resin composition for a surgical guide may be prepared. The composition and effects of the photocurable resin composition for a surgical guide are the same as those described above.

In the step (b) the photocurable resin composition may be laminated by 3D printing, and in the step (c), the product of the step (b) may be washed with a washing solution. During the lamination, the 3D printing may be performed under a light source of 360 to 405 nm, for example, 380 to 400 nm. Additionally, when the light source irradiating the light is out of the above range, the proper curing may not occur during the additive manufacturing. Therefore, it may be difficult to maintain an appropriate shape in the subsequent washing process.

In the step (d), the product of the step (c) may be cured with a light source of 360 to 405 nm for 10 to 30 minutes, and for example, may be cured for 15 to 25 minutes with a light source of 380 to 400 nm. The step (d) can be cured using a post-curing machine, and a precise surgical guide can be manufactured through meticulous post-processing including the step (d).

The 3D printing may be performed by one selected from a group consisting of a stereolithography apparatus, a digital light source processing, and a stereolithography surface curing method, and characteristics, etc. of the method are the same as those described above.

The x-axis precision of the 3D printing is 50 to 100 μm, and this layer thickness is a thickness generally used in 3D printing for a dental use. When the z-axis precision of the 3D printing is less than 50 μm, the total amount and number of light energy applied to the composition may increase, thereby slowing the output speed.

Hereinafter, the embodiments of the present invention will be explained in detail.

EXAMPLE 1

35 parts by weight of urethane-dimethacrylate copolymer, 55 parts by weight of bisphenol A ethoxylate dimethacrylate, 6 parts by weight of tetrahydrofurfuryl methacrylate, 2 parts by weight of phenylbis(2,4,6-trimethylbenzoyl)-phosphine oxide, and 0.005 part by weight of 2,5-bis(5-tert-butyl-2-benzoxazolyl)thiophene) were mixed to manufacture a photocurable resin composition.

EXAMPLE 2

35 parts by weight of urethane-dimethacrylate copolymer, 55 parts by weight of bisphenol A ethoxylate dimethacrylate, 6 parts by weight of tetrahydrofurfuryl methacrylate, 2 parts by weight of phenylbis(2,4,6-trimethylbenzoyl)-phosphine oxide, and 0.05 part by weight of 2,5-bis(5-quatenary-butylbenzoxazol-2-yl)thiophene were mixed to manufacture a photocurable resin composition.

EXAMPLE 3

35 parts by weight of urethane-dimethacrylate copolymer, 55 parts by weight of bisphenol A ethoxylate dimethacrylate, 6 parts by weight of tetrahydrofurfuryl methacrylate, 2 parts by weight of phenylbis(2,4,6-trimethylbenzoyl)-phosphine oxide, and 0.5 part by weight of 2,5-bis(5-quatenary-butyl-benzoxazol-2-yl)thiophene were mixed to manufacture a photocurable resin composition.

EXAMPLE 4

35 parts by weight of urethane-dimethacrylate copolymer, 55 parts by weight of bisphenol A ethoxylate dimethacrylate, 6 parts by weight of tetrahydrofurfuryl methacrylate, 2 parts by weight of phenylbis(2,4,6-trimethylbenzoyl)-phosphine oxide, and 1.0 part by weight of 2,5-bis(5-quatenary-butyl-benzoxazol-2-yl)thiophene were mixed to manufacture a photocurable resin composition.

Comparative Example 1

35 parts by weight of urethane-dimethacrylate copolymer, 55 parts by weight of bisphenol A ethoxylate dimethacrylate, 6 parts by weight of tetrahydrofurfuryl methacrylate, and 2 parts by weight of phenylbis(2,4,6-trimethylbenzoyl)-phosphine oxide were mixed to manufacture a photocurable resin composition.

Experimental Example 1: Confirmation of Phostability and Z-Axis Precision

The compositions of the examples and comparative examples were tested to draw a working curve using a 3D printer disclosed in Korean Patent No. 1,772,999, and a result thereof is shown in FIG. 1.

In FIG. 1, it can be confirmed that each embodiment implements the layer thickness of 50 to 100 μm, i.e., a target Z-axis precision.

In the case of Examples 2 to 4, although the amount of light input for implementing the target layer thickness was large, the photostability was excellent because the range of light amount that could reach the target thickness was wide due to a low slope. In example 1 with a small content of the light absorbent and comparative example 1 without the light absorbent, the range of the layer thickness was wide, but the photostability was lower than that of other candidate groups.

In this case, in the case of Examples 3 and 4, excessively long time was required for lamination with the layer thickness of 100 μm, and accordingly the over-curing occurred due to a side reaction, resulting in the output of unwanted shapes such as a sludge.

Experimental Example 2: Confirmation of Z-Axis Precision Implementation

By using the 3D printer disclosed in Korean Patent No. 1,772,999, the compositions in the examples and comparative examples were manufactured as a scaffold cube having a single axis size of 10 mm and an axis thickness of 1 mm and shown in FIG. 2. After washing the cube with isopropyl alcohol, a specimen cured for 20 minutes was manufactured 5 times using the post-curing machine equipped with the light source of 380 to 400 nm, and average values of the thicknesses in the first axis and second axis are shown in FIG. 2 and Table 1 below.

TABLE 1

| Specimen (mm) | | First axis | | Second axis | |
|---|---|---|---|---|---|
| | | Measurement | Error | Measurement | Error |
| Comparative Example 1 | 4.0 s | 1.037 | 0.037 | 1.111 | 0.111 |
| Example 1 | 3.3 s | 0.963 | 0.037 | 1.029 | 0.029 |
| Example 2 | 5.6 s | 1.022 | 0.022 | 1.040 | 0.040 |
| Example 3 | 9 s | 0.985 | 0.015 | 1.030 | 0.030 |
| Example 4 | 15 s | 1.014 | 0.014 | 1.037 | 0.037 |

Referring to FIG. 2 and Table 1, it can be confirmed that there is a difference in z-axis precision because the thickness of the axis varies depending on whether the UV absorber is included. In the case of measurements in the second axis, an error between the z-axis thickness and a design dimension was 0.040 mm or less in the comparative examples and all examples. However, in the case of measurements in the second axis, examples 1 to 4 including the UV absorber all showed an error of 0.040 mm or less, but comparative example 1 without containing the UV absorber at all showed an error of 0.100 mm or more, indicating that the z-axis precision was insufficient. Therefore, it can be confirmed that photostability can be improved by including the UV absorber.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

What is claimed is:

1. A photocurable resin composition for a surgical guide, comprising:

20 to 35 parts by weight of (meth)acrylate-based urethane copolymer;

40 to 70 parts by weight of a first (meth)acrylate-based monomer;

4 to 9 parts by weight of a second (meth)acrylate-based monomer;

1 to 4 parts by weight of a photoinitiator; and greater than 0.005 parts by weight and 0.05 or less parts by weight of a UV absorber, wherein the first and second (meth)acrylate-based monomers are polyfunctional and monofunctional (meth) acrylate-based monomers, respectively.

2. The photocurable resin composition for a surgical guide of claim 1, wherein the photoinitiator may be one selected from a group consisting of acetophenone-based compound, a benzophenone-based compound, a triazine-based compound, a biimidazole-based compound, a thioxanthone-based compound, an oxime ester-based compound, an acylphosphine oxide-based compound, and a mixture of at least two of the above compounds.

3. The photocurable resin composition for a surgical guide of claim 1, wherein the UV absorber may be one selected from a group consisting of a phenyl salicylate-based absorber, a benzophenone-based absorber, and a benzotriazole-based absorber.

4. The photocurable resin composition for a surgical guide of claim 1, wherein the composition may be a liquid composition used for one 3D printing selected from a group consisting of a stereolithography apparatus, a digital light source processing, and a stereolithography surface curing method.

5. A surgical guide manufactured by irradiating the photocurable resin composition for a surgical guide according to claim 1 by 3D printing.

6. The surgical guide of claim 5, wherein the surgical guide may be manufactured by irradiating light from a light source of 360 to 405 nm.

7. A method for manufacturing a surgical guide, comprising:

(a) preparing the photocurable resin composition for a surgical guide according to claim 1;

(b) laminating the photocurable resin composition by 3D printing;

(c) washing a product of the step (b) with a washing solution; and (d) curing a product of the step (c) with a light source of 360 to 405 nm for 10 to 30 minutes.

8. The method of claim 7, wherein the 3D printing in the step (b) may be performed in the light source of 360 to 405 nm.

9. The method of claim 7, wherein the 3D printing may be performed by one selected from a group consisting of a stereolithography apparatus, a digital light source processing, and a stereolithography surface curing method.

10. The method of claim 7, wherein a z-axis precision of the 3D printing may be 50 to 100 μm.

* * * * *